(12) United States Patent
Dudziak

(10) Patent No.: US 6,588,084 B2
(45) Date of Patent: Jul. 8, 2003

(54) PROCESS FOR PRODUCING A CIRCUMFERENTIALLY CLOSED HOLLOW PROFILE

(75) Inventor: Kai-Uwe Dudziak, Stelle (DE)

(73) Assignee: DaimlerChrysler AG, Stuttgart (DE)

( * ) Notice: Subject to any disclaimer, the term of this patent is extended or adjusted under 35 U.S.C. 154(b) by 79 days.

(21) Appl. No.: 09/953,368

(22) Filed: Sep. 17, 2001

(65) Prior Publication Data
US 2002/0069502 A1 Jun. 13, 2002

(30) Foreign Application Priority Data
Sep. 16, 2000 (DE) .......................................... 100 45 938

(51) Int. Cl.⁷ ............................................... B23P 17/00
(52) U.S. Cl. .................. 29/421.1; 29/897.2; 29/525.14; 29/557
(58) Field of Search ............................. 29/421.1, 897, 29/897.2, 897.3, 417, 428, 525.13, 525.14, 557, 890.141; 72/368, 51, 61, 62, 370.23, 370.04, 370.22; 228/170, 173.1, 173.4

(56) References Cited

U.S. PATENT DOCUMENTS

| | | | | |
|---|---|---|---|---|
| 3,209,432 A | * | 10/1965 | Cape ......................... | 29/897.2 |
| 3,238,610 A | * | 3/1966 | Berg ......................... | 228/155 |
| 3,564,896 A | * | 2/1971 | Clark et al. ..................... | 72/368 |
| 3,890,696 A | * | 6/1975 | Buske ....................... | 228/173.6 |
| 5,333,775 A | * | 8/1994 | Bruggemann et al. ...... | 228/157 |
| 5,735,156 A | * | 4/1998 | Yoshitomi et al. ............. | 72/57 |
| 6,216,509 B1 | * | 4/2001 | Lotspaih et al. ................ | 72/61 |
| 6,332,346 B2 | * | 12/2001 | Komiya et al. ................ | 72/58 |
| 6,349,521 B1 | * | 2/2002 | McKeon et al. ........... | 52/735.1 |

FOREIGN PATENT DOCUMENTS

| | | | |
|---|---|---|---|
| JP | 52-46254 | * | 12/1977 |
| JP | 4-251612 | * | 8/1992 |
| WO | 00/10748 | | 3/2000 |

* cited by examiner

*Primary Examiner*—Gregory Vidovich
*Assistant Examiner*—T. Nguyen
(74) *Attorney, Agent, or Firm*—Kenyon & Kenyon

(57) ABSTRACT

A process is for producing a circumferentially closed hollow profile, which is of frustoconical form in sections, from a sheet-bar blank. To produce hollow profiles of this type, the sheet bar is cut to size so that a blank with a rectangular section and a ring segment, the summit of which adjoins the center of one side of the rectangle, while its outer arc, which faces the rectangle, is of approximately the same length as the length of the side of the rectangle, is formed, sheet-bar material also being left on the blank outside the summit, between the ring segment and the side of the rectangle, this material joining the ring segment with the side of the rectangle integrally at all locations and also joining the corners of ring segment and rectangle which are closest together, so as to form a rounded edge contour. Then the side edges of the blank are bent into abutment with one another about the longitudinal center axis of the blank. After the bending operation, the edges of the sheet-bar blank are joined together by a longitudinal seam weld, so as to form a preform of the hollow profile, which is then deformed into the final form by internal high-pressure fluid.

10 Claims, 2 Drawing Sheets

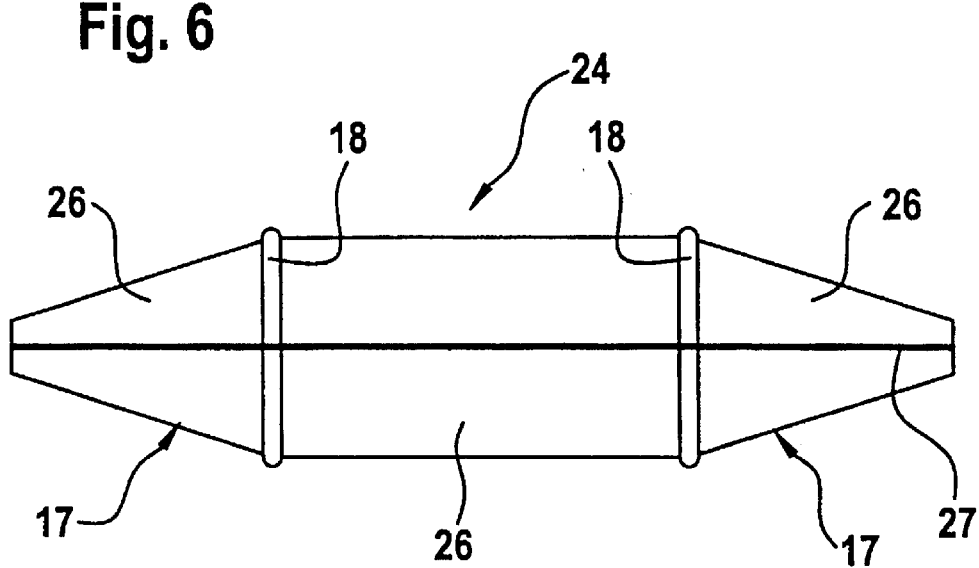
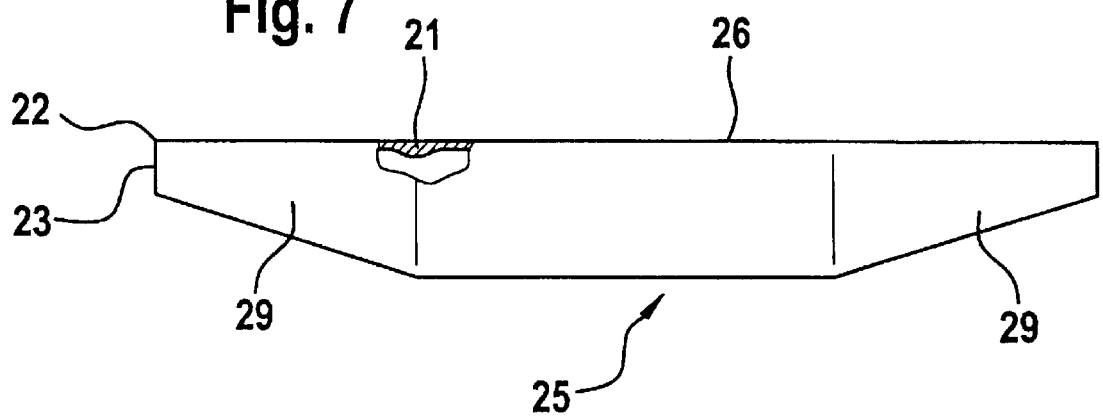

PROCESS FOR PRODUCING A CIRCUMFERENTIALLY CLOSED HOLLOW PROFILE

FIELD OF THE INVENTION

The present invention relates to a process for producing a circumferentially closed hollow profile.

BACKGROUND INFORMATION

International Published Patent Application No. WO 00/10748 describes a process for producing a hollow profile, in which a sheet-bar blank is rolled or formed into a hollow profile, is then welded along the edges which face one another, and finally undergoes a fluid-widening so as to match the form of the impression of an internal high-pressure forming die. This works without problems in the case of purely cylindrical or purely frustoconical hollow profiles. However, in the case of different desired geometries over the longitudinal extent of the hollow profile, as illustrated in FIGS. 5 and 6, are unable to offer a satisfactory solution, since as illustrated in FIGS. 5 and 6, during the rolling or forming of the sheet-bar blanks, the edges which are arranged opposite one another can in no way be made to completely abut one another, so that they can then be welded together in a simple manner. Rather, major welding work with filler or even additional metal sheets is required in order to close off the gaps which form. Moreover, at these locations, the weld seams which form extend so that they are highly unsuitable for subsequent internal high-pressure forming, due to their circumferentially oriented component, and have a tendency to tear during such a process.

It is an object of the present invention to provide a process with which circumferentially closed hollow profiles with a geometry which is frustoconical in sections may be produced as easily as possible and using a reliable process.

SUMMARY

The above and other beneficial objects of the present invention are achieved by providing a method as described herein.

In accordance with the present invention, the configuration of the sheet-bar blank and the combination of bending and compression movements of the sheet-bar blank make it possible to bring the side edges into abutment with one another. Consequently, the edges may easily be joined together without the use of fillers and other auxiliary materials, by longitudinal seam welding, to form the preform, which is near net shape, of the desired hollow profile before this preform is deformed into the final form by internal high-pressure fluid. The preform is in this case formed from a cylindrical section and a frustoconical section which axially adjoins the cylindrical section, the frustoconical section tapering outwardly away from its connection part. The special blank, which ensures that there is a transition between the frustoconical section and the cylindrical section of the hollow-profile preform without any gaps after the bending operation, allows pure longitudinal seam welding, in which the hollow-profile preform does not have any seam components extending in the circumferential direction, so that the fluid widening of the preform into the final form may be performed using a reliable process and without the risk of cracks forming in the seam. The process according to the present invention allows the production, with a reliable process, of hollow profiles in which there are changes in cross-section with a widening ratio at which—starting from a conventional tube blank of constant diameter—the elongation at break of the material used may be exceeded and therefore there may be an unavoidable risk of flaking or cracking during the widening operation. Consequently, it is possible to produce components that have cross-sections which vary in the axial direction. Even components that do not allow a weld seam in the circumferential direction, such as axle beams, may be manufactured in this manner.

BRIEF DESCRIPTION OF THE DRAWINGS

FIG. 6 is a top view of the hollow-profile form illustrated in FIG. 4 in a flattened example embodiment.

FIG. 7 is a side view of the hollow-profile form illustrated in FIG. 6 after leveling of the circumferential bead.

DETAILED DESCRIPTION

Figure 1:
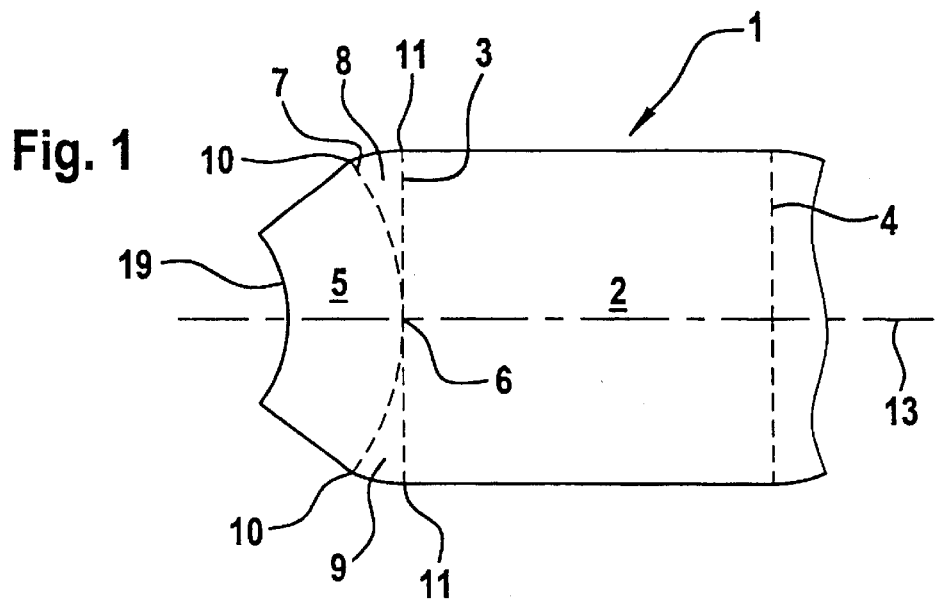
FIG. 1 is a plan view of a sheet-bar blank according to the present invention with two ring-segment sections integrally joined to a rectangular section.

FIG. 1 illustrates a sheet-bar blank 1 or a blank made from steel strip material which may be unwound from a coil, in particular—due to its deformability—a hot strip steel, or a light metal material, the blank 1, in terms of its basic outline, being composed of two geometric forms. The forms include a rectangular section 2 and one ring segment 5 arranged on each of two opposite sides 3, 4 (indicated by dashed lines) of the rectangle. When considered in geometrical terms, the summit 6 of the ring segment 5 touches the center of the facing side 3, 4 of the rectangle. The length of the outer, longer arc 7, which faces the side 3, 4 of the rectangle and is indicated by dashed lines, of the ring segment 5 approximately corresponds to the length of the side 3, 4 of the rectangle. The inner, shorter arc 19 and the outer, longer arc 7 of the ring segment 5 in each case form a section of a circle and extend concentrically with respect to one another. This may be the configuration for the optimum blank. Moreover, an upper section 8 and a lower section 9 including sheet-bar material are left on the blank 1 outside the summit 6, between the ring segment 5 and the side 3, 4 of the rectangle, this material integrally joining the arc 7 of the ring segment 5 to the side 3, 4 of the rectangle at all locations. The section 8, 9 is in each case in the form of a triangle which is curved on two sides and includes one linear side, namely half of the side of the rectangle, the corners 10 (in this case the upper or lower end point of the arc 7) and 11 of ring segment 5 and rectangle side 3, 4 which are closest to one another being joined to form a convexly rounded edge contour. The sections 8, 9 illustrated in FIG. 1 are areas which result from purely theoretical considerations and may have to be filled in order to obtain a continuous component. However, these areas may have to be determined individually on the basis of theoretical considerations, such as, for example, deformation simulation calculations (finite element models) or experimental investigations.

Figure 2:
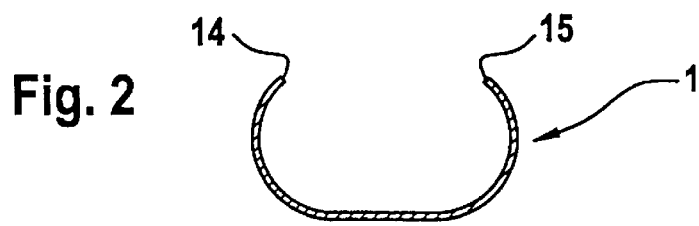
FIG. 2 is a cross-sectional view through the sheet-bar blank illustrated in FIG. 1 during a bending operation.
Figure 3:
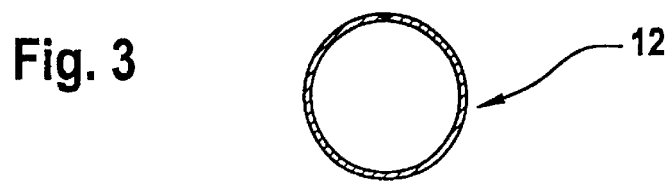
FIG. 3 is a cross-sectional view through the sheet-bar blank illustrated in FIG. 1 taken along the line III—III shown in FIG. 4 once it has been fully bent into a hollow-profile preform and has been welded along the edges.
Figure 4:
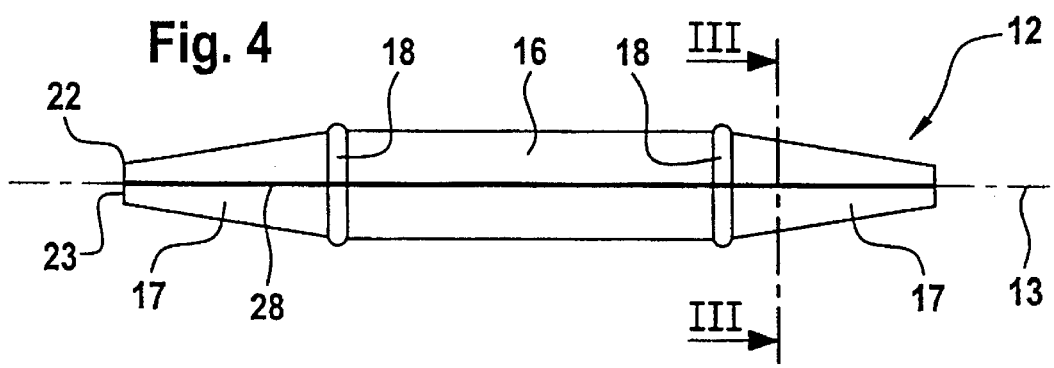
FIG. 4 is a side view of the fully bent, compressed and welded hollow-profile preform illustrated in FIG. 3.

After the blank 1 has been produced, the blank, as illustrated in FIG. 2, is bent or roll-formed about the longitudinal center axis 13 of the blank in a forming or bending die, to form a rotationally symmetrical preform 12, the side edges 14, 15 of the blank being brought into abutment (FIG. 3). During the bending operation, which may be implemented by a bending press, the sheet-bar blank 1 is axially compressed from both ends by at least one axial ram, with the result that a cylindrical section 16 and, at both ends of this section 16, in each case one frustoconical section 17 of the hollow-profile preform 12, which axially adjoins the cylindrical section, are formed (FIG. 4). The sheet-bar material of the sections 8 and 9 which has been left between the ring segment 5 and the rectangular section 2, due to the displacement of material caused by the axial compression and the bending, forms a radially projecting circumferential bead 18 which is located in the transition from the cylindrical section 16 to the frustoconical section 17 and may be formed on the outer circumference or on the inner circumference. The thickness of the form of the circumferential bead 18 may vary over the circumference.

In view of the stability of the blank 1, in terms of rigidity, increasing as the bending progresses, the compression operation may be performed using an axial force which takes account of this process, i.e., when only small radii have been formed at the start of the bending process, the axial force may be correspondingly low, due to the risk of the blank 1 kinking. If appropriate, the compression operation may only commence in the final phase of the bending operation. Since the material which is to be displaced is not distributed uniformly in the circumferential direction of the hollow profile which is to be produced, i.e., it decreases from the edge toward the summit 6 of the ring segment 5, a compressive force which is matched to the particular local provision of material may be ensured during the compression operation, i.e., there may be a higher force where there is more material. Accordingly, the thickness of the circumferential bead or the drop at the transition in geometries 18 (outwardly projecting bead or inwardly protruding bead) decreases from the abutment point of the edges 14, 15 toward the summit 6 of the ring segment 5. The arrangement of the circumferential bead 18 is to this extent only to be considered as a schematic representation illustrated in FIG. 4. On the side which is remote from the rectangle 2, the ring segment 5 of the blank 1 has an inner, shorter arc 19, which extends concentrically with respect to the longer, outer arc 7. The shorter the inner arc 19 relative to the outer arc 7, the steeper the taper of the frustoconical section 17, which is formed as a straight truncated cone.

As an alternative to the procedure which has been described above, the blank 1 may be compressed in the tangential direction only by the bending movement in the regions 8, 9, with the result that the section 16 and the section 17 of the hollow-profile preform 12 are formed. Depending on the form of rounding of the edge contour of the blank 1 in the region of the transition between the ring segment 5 and the rectangular section 2, the result is an excess of material (convex form) or an insufficiency of material (concave form). In the case of the convex form, compressive stresses arise during bending, while in the case of the concave form tensile stresses arise during bending, which may lead to thinning of material in the transition region. The sheet-bar material of the sections 8 and 9 which has been left between the ring segment 5 and the rectangular section 2, due to the axial compressive or tensile stresses which result from the bending, forms an undefined transition from the cylindrical section 16 to the frustoconical section 17. This transition may be in the form of a bead 18 which projects radially outwardly on the outer circumference of the preform 12 of the hollow profile produced in this manner (excess of material and consequently compressive stresses) or as a rounding or inward drop (tensile stresses), so as to form a radially inwardly directed circumferential bead on the inner circumference of the preform 12 of the hollow profile.

The side edges 14, 15 are then longitudinal-seam welded together along the abutment line. The resulting weld seam 28 may be produced by a jet or beam welding process, in particular by a laser or plasma pulse. This requires a corresponding device which guides the jet or beam in two dimensions (FIGS. 3 and 4). Then, the preform 12 achieved in this manner, which approximates to the final form 20 of the hollow profile which is to be produced, is placed into an internal high-pressure forming die and is widened to the final form 20 in this die.

Figure 5:
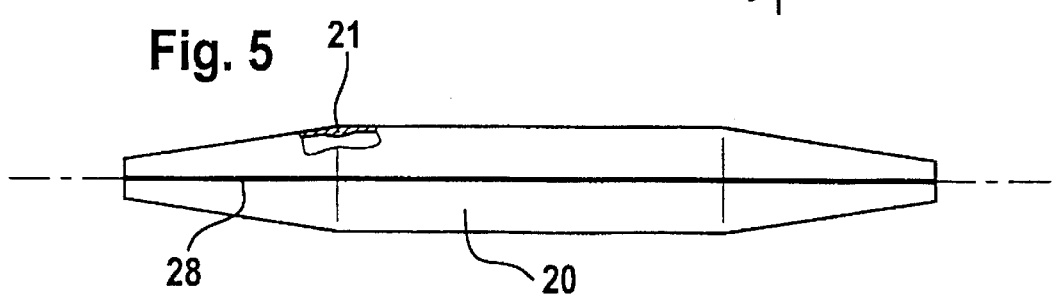
FIG. 5 is a side view of the final form of the hollow-profile after leveling and widening of the preform illustrated in FIG. 4.

In accordance with FIG. 5, which schematically illustrates the widened state of the hollow profile, the circumferential bead 18, which disrupts the form of the outer contour and is formed during compression from the displaced sheet-bar material, which, although it is required in order to make the ring-segment form and the rectangle form of the sheet-bar blank 1 sufficiently integral and therefore in order to avoid circumferential weld seams, is surplus to requirements after the desired preform 12 of the hollow profile has been formed, is leveled during the widening due to the hydraulic pressure, without further process features or steps, so that all that remains is an inwardly directed wall thickening 21 at the location of the bead 18. As an alternative to the leveling of the bead 18 by high-pressure fluid, which is an economical process, this may also be performed before the internal high-pressure process, by mechanical stretching of the welded preform 12.

If the circumferential bead 18 is to remain in place, for example, for installation reasons, it is possible, by suitably configuring the die impression, to provide a circumferential groove into which the circumferential bead 18 is widened during the internal high-pressure forming, so that it substantially retains its shape.

Furthermore, it is possible to use forms in which the cones are not rotationally symmetrical with respect to the principal center axis. This may give rise to special blanks, but the processes described above are in general terms retained. An alternative example embodiment in this respect is illustrated in FIGS. 6 and 7. In this alternative example embodiment, the preform 12 of the hollow profile, which has not yet been joined at the edges 14, 15, between the bending operation and the longitudinal seam welding, is flattened in the region of the edges 14, 15, from the top down to the plane of the upper edge 22 of the opening 23 of the frustoconical section 17, to produce an intermediate form 24, and then follows the longitudinal seam welding at the abutting edges 14, 15. For this purpose, the flattening allows a substantially one-dimensional (apart from the location of the circumferential bead 18), linear jet or beam welding process to be performed relatively simply so as to form the weld seam 27. Finally, the intermediate form 24 is widened to the final form 25 in the internal high-pressure forming die, the circumferential bead 18 also being leveled in the process. As illustrated in FIG. 7, the final form 25 obtained is not rotationally symmetrical. The flattening means that, due to the accumulation of material which is achieved, there is a particularly large amount of hollow-profile material available for the widening, which may be advantageous and considerably increases the process reliability during the internal high-pressure forming process. The final form 25, which is illustrated in FIG. 7, is in the form of an inclined truncated cone 29 below its planar surface 26, with the result that the overall circumferentially closed hollow profile has a frusto-conical form in sections. It is also possible, as a modification to the final form 25 illustrated in FIG. 7, for the intermediate form 24 to be widened to a rotationally symmetrical final form.

Alternatively, it is possible to produce a hollow profile with an inclined truncated cone 29 by forming the blank so that the inner, shorter arc 19 of the ring segment 5 forms a section of an ellipse and the outer, longer arc 7 forms a section of a circle. The blank 1, in the region of the ring segment 5, is then bent into an inclined truncated cone 29, so that its edge abutment line adjoins that of the cylindrical section 16 in collinear form. The result is a single-dimensional beam guidance during the laser-beam welding along the edge abutment line on a curved circumferential surface of the hollow profile. If appropriate, the circumferential bead is also eliminated, so that there are not even minor inconsistencies in the beam guidance.

The preform of the hollow profile may undergo intermediate annealing before the internal high-pressure forming process, so that better deformability of the preform is achieved, in particular after flattening which results in cold work-hardening.

While the final forms of the example embodiments illustrated are provided with a truncated cone or frustoconical section on both sides, it is possible, within the scope of the present invention, for the hollow profile which is to be produced also to be formed as a truncated cone or frusto-conical section on only one side.

The process may be used, for example, for the production of axle beams, in particular rear axle beams (supports, arms, struts, etc.) for motor vehicles. This also encompasses longitudinal beams and cross-beams with considerably varying cross-sections in the central region, which with conventional internal high-pressure forming production steps require an internal high-pressure forming preform or internal high-pressure forming preliminary widening.

What is claimed is:

1. A process for producing a circumferentially closed hollow profile, which is of frustoconical form in sections, from a sheet-bar blank, comprising the steps of:

cutting a sheet bar to size to form a blank having a rectangular section and a ring segment, a summit of which adjoining a center of one side of the rectangle, an outer, longer arc, which faces the rectangle, having approximately the same length as a length of the side of the rectangle, sheet-bar material being left on the blank outside the summit between the ring segment and the side of the rectangle and joining the ring segment with the side of the rectangle integrally at all locations and joining corners of the ring segment and the rectangle that are closest together to form a rounded edge contour;

bending the side edges of the blank into abutment with one another about a longitudinal center axis of the blank to form a cylindrical hollow-profile section and a frustoconical hollow-profile section adjoining the cylindrical hollow-profile section;

joining together the edges of the blank bent into abutment with one another in the bending step only by a longitudinal seam weld to form a preform of the hollow profile; and deforming the preform, which approximates to a final form of the hollow profile, achieved in the joining step into the final form by internal high-pressure fluid.

2. The process according to claim 1, wherein the bending step includes the substep of axially compressing the blank so that the sheet-bar material left between the ring segment and the rectangular section forms a radially projecting circumferential bead arranged between a transition between the cylindrical hollow-profile section and the frustoconical hollow profile section.

3. The process according to claim 1, further comprising the step of leveling a circumferential bead that forms during the bending step.

4. The process according to claim 1, further comprising the step of flattening the preform of the hollow profile in a region of the edges between a top and a plane of an upper edge of an opening of the frustoconical hollow profile section, the flattening step being performed between the bending step and the joining step.

5. The process according to claim 2, further comprising the step of leveling the circumferential bead of the hollow profile, which has not yet been fully deformed, by internal high-pressure forming.

6. The process according to claim 2, further comprising the step of leveling the circumferential bead of the hollow profile, which has not yet been fully deformed, by stretching the hollow-profile preform.

7. The process according to claim 1, further comprising the step of intermediately annealing the preform of the hollow profile before the internal high-pressure deforming step.

8. The process according to claim 1, wherein the sheet-bar material includes a hot strip steel.

9. The process according to claim 1, wherein an inner, shorter arc of the ring segment forms a section of an ellipse and the outer, longer arc forms a section of a circle, and wherein the blank, in the a region of the ring segment is bent in the bending step into an inclined truncated cone so that an edge abutment line of the cone adjoins an edge abutment line of the cylindrical section in collinear form.

10. The process according to claim 1, wherein an inner, shorter arc and the outer, longer arc of the ring segment each form a section of a circle and extend concentrically with respect to one another, and wherein the blank is bent in the bending step into a straight truncated cone in a region of the ring segment.

* * * * *